Oct. 26, 1948.   C. L. RHODES   2,452,148
ADJUSTABLE KEYHOLE SAW
Filed Oct. 23, 1945
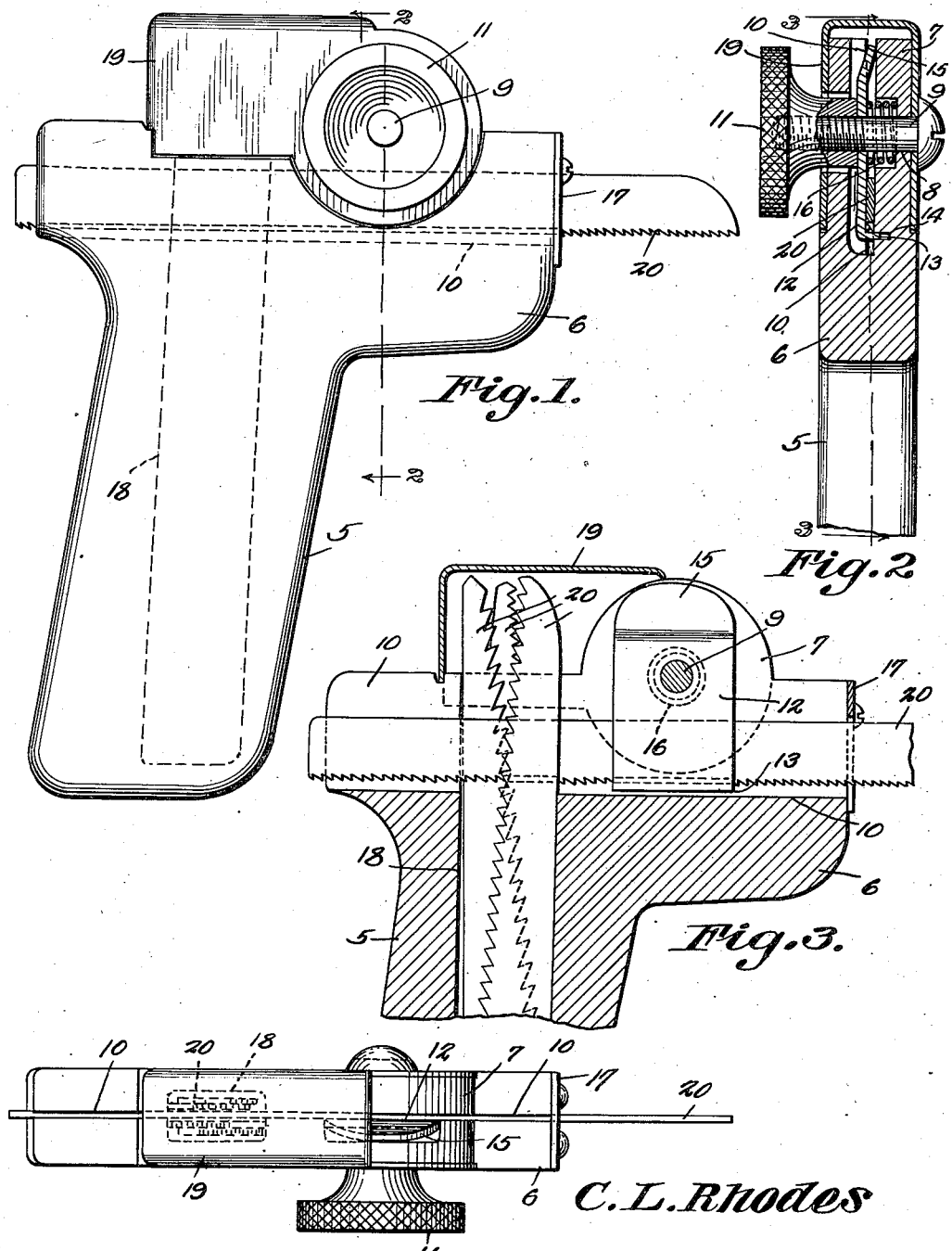
C. L. Rhodes
INVENTOR.
BY
ATTORNEYS.

Patented Oct. 26, 1948

2,452,148

UNITED STATES PATENT OFFICE 2,452,148

ADJUSTABLE KEYHOLE SAW

Curtis Lee Rhodes, Ripley, W. Va.

Application October 23, 1945, Serial No. 624,074

2 Claims. (Cl. 145—108)

This invention relates to hand saws, and more particularly to saws of the keyhole type.

An important object of the invention is to provide a keyhole saw embodying a handle, shaped in such a way that a chamber or magazine is provided, in which saw blades of various sizes may be contained for ready use, when desired.

Another object of the invention is to provide a saw having means for removably securing the saw blades to the handle thereof, to insure against the saw blade twisting in the handle under the strain of sawing.

Still another object of the invention is to provide securing means for securing the blade to the handle so that the blade may be adjusted for length with respect to the saw handle to the end that it will be possible to provide an exceptionally short blade for use in restricted areas.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing,

Figure 1 is a side elevational view of a saw constructed in accordance with the invention, illustrating a saw blade positioned for use.

Figure 2 is a sectional view taken on line 2—2 of Figure 1.

Figure 3 is a sectional view taken on line 3—3 of Figure 2.

Figure 4 is a plan view of the saw.

Referring to the drawing in detail, the handle, which is of a pistol grip type, is indicated generally by the reference character 5 and is formed with an upper enlarged portion 6.

The upper edge of the enlarged portion 6 is formed with an offset portion 7 having a transversely disposed bolt opening 8 in which the bolt 9 is positioned.

The offset portion 7 and upper enlarged portion 6 are slotted as at 10 for the reception of the removable saw blades.

As shown by Figure 2 of the drawing, the bolt opening at one side of the upper enlarged portion 6 is substantially large, to accommodate the inner end of the nut 11, so that the inner end of the nut 11 may extend into the slot 10 and engage the saw plate 12 which is also mounted in the slot 10. This saw plate 12 is formed with a right angled end portion 13 adapted to fit in the notch 14 formed in one wall of the slot 10, to hold the plate in its proper position within the slot. The opposite end of the plate is slightly offset as at 15 to lend resiliency to the plate.

A coiled spring indicated at 16 is mounted on the bolt 9 and rests in a recess formed in one side of the wall of the slot 10, the spring 16 engaging one side of the plate 12, normally urging the plate toward the nut 11 to provide a clearance between one wall of the slot 10 and the plate so that a saw blade may be readily positioned by sliding it into one end of the slot 10.

Positioned on the forward end of the enlarged portion 6 is a wear plate 17 which is formed with a slot which aligns with the slot 10, the bottom of the slot providing a surface against which the back of the saw blade positioned in the handle, may engage when pressure is brought to bear on the saw blade in sawing.

An opening 18 is formed in the main portion of the handle 5, and provides a magazine for various sized and types of saw blades. The upper end of the opening is closed by means of the cover 19 which is held in position by means of the bolt 9 and the nut 11. The bolt 9 is shown as passing through openings in the cover, the head of the bolt engaging the cover to press the cover into close engagement with the handle and prevent movement of the cover, under normal conditions.

From the foregoing it will be seen that due to the construction shown and described, a saw blade such as indicated at 20 can be removed from the magazine and inserted in the slot 10, between the saw plate 12 and the wall of the slot. The nut 11 is now operated to set up a binding action between the plate 12 and saw blade 20 held thereagainst, thereby securing the saw blade within the handle. It will be seen that by loosening the nut 11, the saw blade may be moved through the slot so that various lengths of the blade may be extended beyond the end of the upper enlarged portion 6 of the handle, providing an exceptionally short saw blade is required. By adjusting the blade to the desired length, the necessity of sawing with only that portion of the saw adjacent to the outer end thereof, is eliminated, when sawing in restricted areas.

From the foregoing it will also be seen that when the saw is not in actual use, the blades may be housed within the magazine and the cover moved to close the end of the magazine, protecting the person carrying the saw against injury by the extended ends of saw blades.

What is claimed is:

1. In a hand saw, a handle having a saw blade receiving slot one side wall of which is formed with a notch, a yieldable saw clamp plate positioned within said blade receiving slot, one end of said plate being extended at right angles and fitted in said notch, securing said plate against twisting, said plate adapted to engage and clamp a saw blade positioned in said slot, a bolt extending transversely through the handle and slot and plate, and a nut on the bolt adapted to engage the plate for moving the plate into clamping relation with the saw blade held in the slot.

2. In a hand saw, a handle having a saw blade receiving slot one side wall of which is formed with a notch, a yieldable saw clamp plate positioned within said blade receiving slot, a flange formed along one edge of the plate and being fitted in the notch, securing the plate against twisting, one end of the plate being curved downwardly to contact said one side wall of the saw blade receiving slot, a bolt extending transversely through the handle slot and plate, said plate adapted to clamp the saw blade against said one side wall of the saw blade receiving slot, and a nut on the bolt adapted to engage the saw plate moving the saw plate into clamping engagement with the saw blade positioned in the slot.

CURTIS LEE RHODES.

REFERENCES CITED

The following references are of record in the file of this patent:

UNITED STATES PATENTS

| Number | Name | Date |
| --- | --- | --- |
| 308,703 | Richardson | Dec. 2, 1884 |
| 672,125 | Heidt | Apr. 16, 1901 |
| 1,173,164 | Berkman | Feb. 29, 1916 |
| 2,307,411 | Leatherman | Jan. 5, 1943 |